April 27, 1926.
W. G. CLARK
1,582,335
APPARATUS FOR MOLDING AND ANNEALING GLASS
Filed May 11, 1920    2 Sheets-Sheet 1
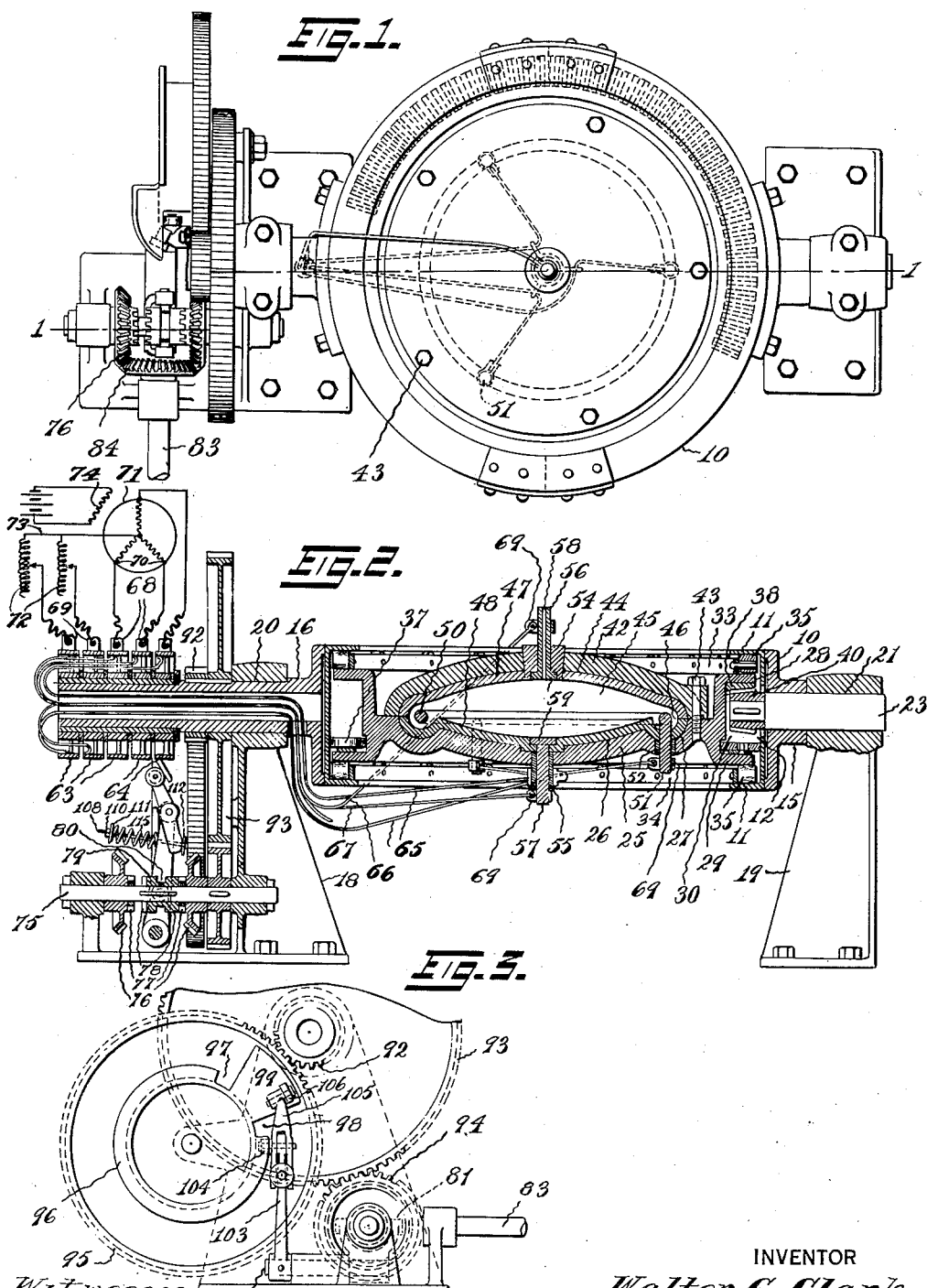
INVENTOR
Walter G. Clark,
BY
ATTORNEY April 27, 1926.
W. G. CLARK
1,582,335
APPARATUS FOR MOLDING AND ANNEALING GLASS
Filed May 11, 1920  2 Sheets-Sheet 2
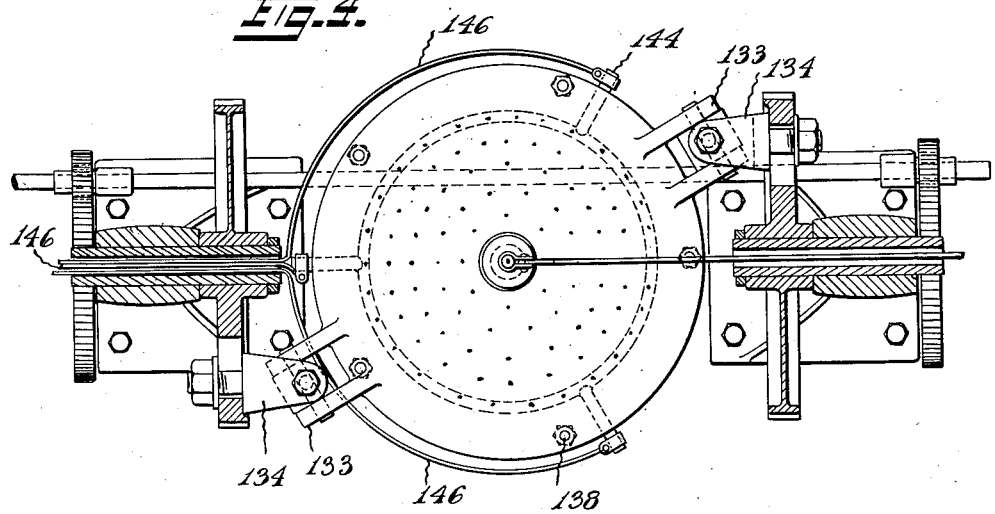
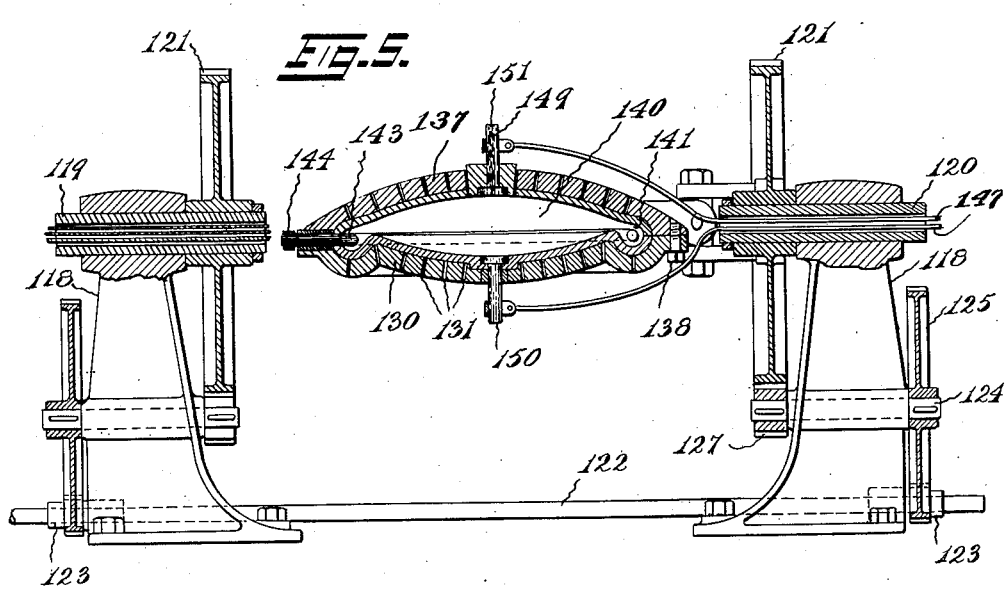
Witnesses:
INVENTOR
Walter G. Clark,
BY
ATTORNEY

Patented Apr. 27, 1926.

UNITED STATES PATENT OFFICE.

WALTER G. CLARK, OF NEW YORK, N. Y.

APPARATUS FOR MOLDING AND ANNEALING GLASS.

Application filed May 11, 1920. Serial No. 380,466.

*To all whom it may concern:*

Be it known that I, WALTER G. CLARK, a citizen of the United States, residing in New York, in the county of New York and State of New York, have invented certain new and useful Improvements in Apparatus for Molding and Annealing Glass, of which the following is a specification.

My present invention relates to improvements in annealing and molding of glass in mass, and more specifically to improvements in making lenses for astronomical telescopes.

Heretofore it has been difficult to handle large masses of glass for large telescopic work owing to the fact that glass in semi-fluid shape or in the molten state would tend to settle and thereby form a plurality of stratas of glass of varying densities. Another difficulty has been that the rate of cooling of the glass under ordinary methods is so uneven that strains are set up in the mass thereof, which after the glass is cooled, interfere with the clearness and definition of the lens.

One object of my invention is to provide a method and means for handling the glass mass during its plastic state for obviating the settling heretofore encountered while the glass is in fluid or semi-fluid state.

Another object of my invention is the provision of efficient means whereby the glass mass may be rotated simultaneously with the application of heat thereto for accomplishing the above object.

Another object of my invention is the provision of means whereby such rotation may be carried on simultaneously in two planes in combination with said heating and melting mechanism.

Another object of my invention is to provide a mold and furnace combined in a single structure adapted for handling a sufficiently large quantity of glass for casting into a lens or other article and thereafter to hold the glass in the desired form without removal from the furnace until slow cooling has taken place. In this way the formation of objectionable strains in the glass during cooling is avoided.

Another object of my invention is the provision of means whereby the fining, during the period that the glass is in a molten state, may be sufficiently complete to insure the removal of the bubbles from the glass.

Other objects of the invention will appear as the description proceeds, and while herein minute details of the invention are described, the invention is not limited to these, since many and various changes may be made without departing from the scope of the invention as claimed.

In the accompanying drawing, showing by way of example two of many possible embodiments of the invention, Figure 1 is a plan view of my device;

Fig. 2 is a sectional view taken on the line 1—1, Fig. 1;

Fig. 3 shows a detail of the gear-reversing rotary drive mechanism; and

Figs. 4 and 5 show partial sectional views of modifications of rotary mechanisms whereby the furnace mold may be rotarily controlled in smaller capacity furnaces.

The form of embodiment of my invention as shown in Figs. 1 to 3 comprises an annular housing or frame 10 provided with inwardly pointing edge flanges 11 (Fig. 2) forming an interior channel way 12 around the frame. Said frame is provided with a bearing boss 15 on one side of the frame, and a hollow sleeve shaft 16 fast on the diametrically opposite side of the frame and alined with the boss. A head standard 18 and a tail standard 19 are provided on opposite sides of the frame and are provided with bores 20 and 21, the former of which receives said sleeve shaft 16, the latter receiving a fixed shaft 23 fast therein and received by and supporting said boss 15 and projecting into the channel way 12, whereby said shafts cooperate for supporting the frame 10 for rotation on its own diameter.

A combined mold and furnace body portion or shell 25 is disposed within said frame and provided with a concaved inner face 26 surrounded by an annular groove 27, and with a pair of peripheral supporting flanges 28 and 29 together forming an outwardly opening channel 30 receiving the end of said fixed shaft 23. Supporting rings 33 and 34 are disposed between said supporting flanges 28 and 29 respectively and the adjacent edge flanges 11 of the frame and carry rollers 35 rotatably mounted on the rings radial thereto and engaging said flanges for rotatably supporting the body portion 25 against movement in the direction of its axis. A series of rollers 37 mounted on the supporting flange 29 engage the frame 10 to hold the body portion rotatably mounted co-axial with the frame.

A gear ring 38 is mounted on the other supporting flanges and meshes with a pinion 40 fast on said fixed shaft, whereby when the frame 10 is rotated on its said diameter, the body portion 25 will be rotated on its own axis.

A lid portion 42 is removably secured on said body portion by means of bolts 43, and is provided with a concaved inner face 44 cooperating with the concaved face 26 and said annular groove 27 of the body portion to form a double convexed furnace and mold chamber 45 surrounded by an annular enlargement 46. Refractory linings 47 and 48 for said chamber are suitably secured to said faces 26 and 44 and the walls of said groove 27.

An annular conducting and heating member 50 is disposed in said enlargement 46 and spaced from said linings and provided with terminals 51 passing to the exterior of said body portion 25 through insulating bushings 52. Insulating bushings 54 and 55 pass axially through said portions 25 and 42 respectively, and axially receive electrodes 56 and 57, the former of which is pierced with an axial vent perforation 58. Said electrodes pass entirely through said bushings and have counter sunk heads 59 at their inner ends.

A group of five slip rings 63 and 64 is provided on said hollow sleeve shaft 16; and conductors 65, 66 and 67 passing through said hollow shaft and secured to collars 69 on said terminals and electrodes, respectively, electrically connect each of said terminals 51 with one of the slip rings 63 and electrodes 56 and 57 with the slip rings 64 respectively. Brushes 68 and 69 engaging the slip rings respectively are connected to the terminals of a suitable source of 3-phase alternating current.

The brushes 68 are preferably connected to the terminals 70 of a Y-connected generator 71; while the brushes 69 are connected to the adjustable resistance 72 in turn connected by the conductor 73 to the mid-point of the Y-connection. The current of the generator may be weakened by weakening the field 74 in the ordinary manner. The resistances 72 serve to vary the current passing to the electrodes 56 and 57.

A suitable means for imparting oscillatory motion to said frame 10 and the body portion 25 will now be described.

A clutch shaft 75 (Fig. 2) mounted on said head standards 18 parallel to the sleeve shaft 16 carries a pair of bevel gears 76 provided with opposed clutch teeth 77 adapted to mesh with either set of said teeth 78 of a clutch sleeve 79 splined and slidable on said clutch shaft and provided with an annular shift-groove 80 which engages a shift yoke 81 (Fig. 3) fast on a rocking shaft 82.

A drive shaft 83 (Fig. 1) carries a drive gear 84 meshing with both of said bevel gears.

A small drive gear 92 and a large driven gear 93 are mounted fast on said sleeve shaft 16 between the standard and said slip rings, the latter meshing with a counter gear 94 fast on said clutch shaft and the former meshing with a cam supporting gear 95 rotatably mounted on said head standard and carrying a guide flange 96 spaced therefrom and provided with a pair of cut-away peripheral portions 97 and 98 and a steep cam flange 99 between said cut-away portions. A rocking arm 103 fast on said rocking shaft 82 is provided at its outer end with a lateral guide roller 104 adapted to ride against the outer or inner face of said guide flange 96 thereby to hold the clutch sleeve 79 locked with one or the other of said bevel gears 76. A shift-lever 105 intermediately fulcrumed on the free end of said rocking arm 103 is provided with a shift roller 106 adapted to engage said cam flange 99. A rod 108 (Fig. 2) loosely passing laterally through said rocking arm has a nut and washer 110 and 111 at its outer end and a head 112 at the inner end, the latter engaging behind the inner face of the inner end of the shift-lever 105. A spring 115 on said rod and compressed between said nut and said inner end, holds said shift-lever in yieldable approximate alinement with said rocking arm whereby when said shift roller 106 engages said cam flange 99, the lateral roller 104 will on continued rotation of the cam supporting gear, be snapped through one of said cut-away portions from the inner face to the outer face of the guide flange, and the clutch sleeve will be thrown from mesh with one wheel 76 to the other, thereby reversing the direction of rotation of the frame 10 and the body and lid portions 25 and 42.

The sizes of the gears 92, 93 and 95 are so selected that the frame 10 makes several rotations and the body portion 25 makes about a quarter rotation for each reversal of the reversing mechanism.

The form of embodiment of my invention shown in Figs. 4 and 5 comprises a pair of supporting standards 118 carrying alined supporting sleeve shafts 119 and 120 rotatable in said standards and each carrying a large gear wheel 121 fast on its inner end. For driving the supporting shafts there is provided a power or drive shaft 122 parallel to said sleeve shafts and provided with drive pinions 123 each engaging a driven gear 125 carried on a counter shaft 124 mounted in the standard and each provided with a counter pinion 127 engaging said gear wheel 121.

The combined mold and furnace comprises a main shell or body portion 130 provided with a plurality of vents 131 and with diametrically oppositely arranged universal connections 133 each having one member 134 secured to said gear wheels 121 respectively at points 180 degrees apart.

A lid portion 137 is secured on the body portion by bolts 128 and forms with said body portion a disk shaped chamber 140 surrounded by an annular enlargement 141, receiving the annular heating conductor 143 provided with radial terminals 144, to which are electrically connected conductors 146 passing through one sleeve shaft 119 for supplying current to the terminals. Conductors 147 passing through the other sleeve shaft 120, supply current to the electrodes 149 and 150, projecting axially into the chamber 140 from opposite sides, the electrodes 149 being provided with an axial vent 151.

The operation of the apparatus of Figs. 1 to 3 is as follows:

The annular conductor 50 is connected through conductors 55 and contact rings 63 with a proper source of three phase alternating current supply and the conductor is thereby maintained at a temperature above the melting point of glass until all of the refractory linings 47 and 48 have attained a temperature above the temperature of molten glass, at which time the electrode 56 together with its insulating bushing 54 is removed and a charge of previously melted glass is poured through the opening into the previously heated chamber completely filling the chamber. The electrode together with its insulating bushing is then inserted in position as shown in Fig. 2. The annular conductor 50 maintains the glass at a fluid temperature, and the gas escaping from the glass is allowed to pass out through the vent 58 in the electrode 56. When the bubbles in the mass of molten glass have passed out and the glass has become thoroughly fined, the electrode 56 and with its bushing 54 are clamped in position and the vent 58 is plugged with a bit of carbon or fire-clay, and the reversing mechanism is started and the frame 10 is caused to revolve in a vertical plane. As the frame 10 thus revolves, the gear ring 38 rotates around the fixed pinion 40 causing the body portion or shell 25 to rotate on its own axis which is at right angles to the axis of rotation of the frame 10.

This rotation of the body portion 25 around its own axis continues until the mold has rotated approximately ninety degrees, when the reversing mechanism reverses the direction of rotation and causes the mold to rotate ninety degrees back to its original position, when the reversing mechanism again reverses. This action continues as long as the glass contained within the cavity is in a molten or semi-molten condition thus preventing any settling or concentrating of the glass anywhere.

The purpose of the electrodes 56 and 57 and the slip ring 64 is to permit better control and distribution of the heat in the molten glass within the chamber 45.

As glass, when in a molten condition, is a conductor of electricity, it is possible to cause current to pass through the mass of glass from the annular conductor 50 to the electrodes 56 and 57 thereby better controlling the temperature of the mass. After the glass has been kept at high temperature sufficiently long the heating current is very gradually reduced, thus permitting a cooling of the glass which is so slow and gradual that no detectable stresses or strains are set up therein.

The operation of the apparatus shown in Figs. 4 and 5 is the same as the operation in Figs. 1 and 2, except that the rotation of the apparatus around the axis will cause the housing with its mold and mass of glass contained therein to alternately tip from side to side as it rotates around the axis of the shafts 119 and 120. The purpose of the rotation and tipping motion is to insure that the mass of glass within the cavity shall be thoroughly mixed before passing into a solid condition.

Obviously the different constructions and modifications of the invention as shown in the drawings may be combined as desired, it being understood that the drawings are merely illustrations of suitable devices for carrying out the invention.

I claim:

1. In combination, an annular frame rotatable on its own diameter and provided with inwardly pointing edge flanges forming an interior channel way around the frame; a combined mold and furnace body portion disposed within said frame and provided with a pair of peripheral supporting flanges together forming an outwardly opening channel; supporting rings disposed between said supporting flanges respectively and the adjacent edge flanges of the frame; rollers rotatably mounted on said rings radial thereto and engaging said flanges for rotatably supporting the body portion against movement in the direction of its axis; a series of rollers mounted on one supporting flange and engaging the frame to hold the body portion rotatably mounted coaxial with the frame; a lid portion forming with said body portion a disk shaped chamber; and means for rotating the body portion as the frame is rotated.

2. In combination, an annular frame provided with inwardly pointing edge flanges forming an interior channel way around the frame; a bearing boss fast on one side of the frame; a hollow sleeve shaft fast on the diametrically opposite side of the frame and alined with the boss; a head standard and a tail standard each provided with bores, the former of which receives said sleeve shaft; a fixed shaft in said boss and the bore of said tail standard; a combined mold and furnace body portion rotatable in said frame on the axis thereof; a lid portion forming with said body portion a disk shaped chamber; a conductor in the edge of said chamber; electrodes passing axially through said portions in to the chamber; slip rings on said rotatable shaft; and conductors passing through said hollow shaft and connecting said rings to said conductor and electrodes respectively; and means for rotating said rotatable shaft alternately in opposite directions.

3. In combination, an annular frame having an interior channel way; a sleeve shaft fast on one side of the frame; a fixed shaft at the diametrically opposite side; a body portion provided with peripheral flanges riding in said way; a lid portion forming a chamber with said body portion; a gear ring on the inner face of one of said flanges; a pinion fast on said fixed shaft and engaging said gear, whereby when the frame is rotated on its diameter, said portion is rotated on its axis; a heating conductor in said chamber; and means for supplying current to the conductor.

4. In combination, an annular frame having an interior channel way; a sleeve shaft fast on one side of the frame; means supporting the diametrically opposite side; a body portion with its peripheral portion riding in said way, and formed with a chamber; a heating conductor in said chamber; and conductors passing through said shaft for supplying current to the conductor.

5. In combination, an annular frame having an interior channel way; a shaft fast on one side of the frame; a fixed shaft at the diametrically opposite side and loosely supporting the frame; a body portion having its peripheral portion riding in said way; a lid portion forming a chamber with said body portion; heating means for said chamber; means for rotating the frame; and means for rotating the body portion.

6. In combination, a rotary frame rotatable on its diameter; a shaft fast on one side of the frame; means supporting the opposite side and said shaft; a mold and furnace body within the frame and provided with a disk shaped chamber surrounded by an annular enlargement; an annular conducting and heating member disposed in said enlargement and provided with terminals passing to the outer face of said body and insulated therefrom; insulated electrodes, passing axially into said chamber and having counter sunk heads at their inner ends; a group of five slip rings on said shaft; conductors respectively connecting each of said terminals and electrodes with one of said slip rings; and brushes engaging the slip rings respectively.

7. In combination, a combined mold and furnace formed with a chamber; an annular conductor in said chamber and provided with exteriorly projecting terminals; electrodes passing into said chamber axially to the conductor; a three phase source of current; and conductors passing from said source and respectively connected to said terminals and electrodes.

8. In combination, a body portion provided with a concaved inner face surrounded by an annular groove; a lid portion removably secured on said body portion provided with a concaved inner face cooperating with the concaved face of the body portion and said annular groove to form a double convexed furnace and mold chamber surrounded by an annular enlargement; an annular conductor in said enlargement and provided with exteriorly projecting insulated terminals; bushings passing axially through said portions; electrodes, one of which is pierced with an axial vent perforation passing through said bushings and having counter sunk heads at their inner ends; and conductors connected to the terminals and electrodes.

9. In combination, a body portion provided with a concaved inner face surounded by an annular groove; a lid portion on said body portion and forming with the latter a double convexed chamber; an annular conductor in the edge portion of said chamber and provided with exteriorly projecting insulated terminals equal angles apart; a source of three phase current; conductors connecting the respective poles of said source to the terminals.

10. In combination, a combined mold and furnace body portion provided with a concaved inner face surrounded by an annular groove and with a pair of peripheral supporting flanges together forming an outwardly opening channel; a lid portion removably secured on said body portion provided with a concaved inner face cooperating with the concaved face of the body portion and said annular groove to form a double convexed furnace and mold chamber surrounded by an annular enlargement; refractory linings for said chamber and secured to said faces and the walls of said groove; an annular conductor in said enlargement and spaced from said lining; insulated electrodes passing axially through said portions; and means for supplying current to the conductor and electrodes.

11. In combination, a combined mold and furnace body portion; a lid portion forming with said body portion a disk shaped chamber; an annular heating conductor in the edge portion of said chamber; and means for supplying current to the conductor.

12. In combination, an oscillating disk shaped mold and furnace member, an endless annular heating conductor within said mold; and means for supplying current to the conductor.

13. In combination, an oscillating disk shaped mold member; an annular heating conductor within said mold; and means for supplying current to more than two points of the conductor.

14. In combination, a combined mold and furnace body portion provided with a concaved inner face; a lid portion secured thereto and forming with said body portion a disk shaped chamber; and refractory linings secured to said portions and forming a refractory lining for the chamber.

15. In combination, a body portion provided with a concaved inner face surrounded by an annular groove; a lid portion secured on said body portion and forming with the latter a double convexed chamber surrounded by an annular enlargement; and an annular heating means in said enlargement.

16. In a device of the class described, the combination with a frame rotating about a horizontal axis, of a plurality of separable mold portions positioned in said frame and attachable to one another to form a closed mold, a projection extending along the outer periphery of one of said mold portions, teeth on the projection, and a firmly fixed gear co-operating with said teeth on said projection, whereby to rotate said mold portion about an axis normal to the axis about which the frame rotates.

WALTER G. CLARK.